United States Patent [19]

Gaul et al.

[11] Patent Number: 5,070,596

[45] Date of Patent: Dec. 10, 1991

[54] INTEGRATED CIRCUITS INCLUDING PHOTO-OPTICAL DEVICES AND PRESSURE TRANSDUCERS AND METHOD OF FABRICATION

[75] Inventors: Stephen J. Gaul, Melbourne; Craig J. McLachlan, Melbourne Beach, both of Fla.

[73] Assignee: Harris Corporation, Melbourne, Fla.

[21] Appl. No.: 606,155

[22] Filed: Oct. 31, 1990

Related U.S. Application Data

[62] Division of Ser. No. 465,314, Jan. 12, 1990, Pat. No. 5,037,765, which is a division of Ser. No. 195,273, May 18, 1988, Pat. No. 4,916,497.

[51] Int. Cl.$^5$ .............................................. H01C 17/06
[52] U.S. Cl. ..................................... 29/620; 29/621.1; 29/418; 156/154; 156/155; 73/720
[58] Field of Search ...................... 29/620, 621.1, 418; 156/154, 155; 73/719, 720, 721, 725, 726, 727

[56] References Cited

U.S. PATENT DOCUMENTS

| | | | |
|---|---|---|---|
| 2,692,190 | 10/1954 | Pritikin | 156/155 |
| 3,864,019 | 2/1975 | Smolinsky et al. | |
| 3,994,559 | 11/1976 | Crow | |
| 3,997,381 | 12/1976 | Wanlass | 156/3 |
| 4,121,334 | 10/1978 | Wallis | 29/621.1 |
| 4,210,923 | 7/1980 | North et al. | 350/96.17 |
| 4,294,510 | 10/1981 | Chappell | 350/96.17 |
| 4,503,709 | 3/1985 | Rühle | 73/727 |
| 4,549,338 | 10/1985 | Abend et al. | |
| 4,611,886 | 9/1986 | Cline et al. | 350/96.20 |
| 4,651,120 | 3/1987 | Aagard | 29/621.1 |
| 4,721,938 | 1/1988 | Stevenson | 338/4 |
| 4,756,590 | 7/1988 | Forrest et al. | 350/96.15 |
| 4,760,569 | 7/1988 | Mahlein | 370/3 |
| 4,771,638 | 9/1988 | Sugiyama et al. | 73/721 |
| 4,814,856 | 3/1989 | Kurtz et al. | 357/73 |
| 4,857,746 | 8/1989 | Kuhlmann et al. | 250/551 |
| 4,897,711 | 1/1990 | Blonter et al. | 350/96.17 |

FOREIGN PATENT DOCUMENTS

| | | |
|---|---|---|
| 55-151377 | 11/1980 | Japan |
| 58-178310 | 10/1983 | Japan |
| 61-217024 | 9/1986 | Japan |
| 63-31600 | 2/1988 | Japan |
| 1-13305 | 4/1989 | Japan |
| 1-115108 | 5/1989 | Japan |
| 1-29809 | 9/1989 | Japan |

OTHER PUBLICATIONS

"Micro-Diaphragm Pressure Sensor", by Sugiyama et al.; 1986, IEEE.
"Scaling Limits in Batch-Fabricated Silicon Pressure Sensors", by Chau et al.; IEEE Transactions on Electron Devices, Apr. 1987.
"Fabrication Techniques for Integrated Sensor Microstructures", by Guckel et al.; 1986, IEEE.
"Silicon and Silicon Dioxide Thermal Bonding", by Black et al.; 1988 Materials Research Society.
"Pressure Sensitivity in Anisotropically Etched Thin-Diaphragm Pressure Sensors", by Clark et al., IEEE Transactions on Electron Devices, vol. Ed-26, No. 12, Dec. 1979.
"Wafer Bonding for Silicon-On-Insulator Technologies", by Lasky; 1986 American Institute of Physics.
"Dielectric Isolation of Silicon by Anodic Bonding", by Anthony; 1985 American Institute of Physics.
"Silicon and Silicon Dioxide Thermal Bonding for Silicon-on-Insulator", by Black et al.; 1988 American Institute of Physics.

Primary Examiner—P. W. Echols
Attorney, Agent, or Firm—Barnes & Thornburg

[57] ABSTRACT

Integrated circuits are formed by bonding two substrates together on a moat or recess. If the moat is exposed at a side wall, an optical fiber is inserted therein and communicates optically with a photoelectric device in the substrate by a slant side wall of the moat. If the moat is sealed by a cover layer resulting from removing all or most of the top substrate leaving the bonding layer as a cover, a pressure responsive device is formed on the cover layer directly or in the remaining top substrate over the sealed cavity.

6 Claims, 3 Drawing Sheets

INTEGRATED CIRCUITS INCLUDING PHOTO-OPTICAL DEVICES AND PRESSURE TRANSDUCERS AND METHOD OF FABRICATION

This is a divisional of application Ser. No. 07/465,314, filed Jan. 12, 1990 now U.S. Pat. No. 5,037,765 which is a divisional application of Ser. No. 07/195,273 filed May 18, 1988, now U.S. Pat. No. 4,916,497 that issued Apr. 10, 1990.

BACKGROUND AND SUMMARY OF THE INVENTION

The present invention relates generally to integrated circuits and more specifically to the use of bonded substrates to form integrated circuits capable of handling fiber optic elements and forming pressure transducers.

There is a substantial amount of research under way to increase the optical communication across an integrated circuit and to and from an integrated circuit. This is to replace the metal interconnects in an effort to reduce surface space needed as well as to minimize cross-talk. A typical example is shown in U.S. Pat. No. 4,549,338 to Abend et al. Optical fibers are positioned in and through a top of the package for the integrated circuit to provide optical transmission to and from areas on the integrated surface substrate. It has even been suggested to laminate the integrated circuit to a transparent insulative layer having a plurality of bores on the backside thereof to receive the fiber optic elements. This is shown in Japanese patent 55-151337 dated Dec. 25, 1980, to Ihara.

However, the general problem with prior art devices is the alignment of the fiber optical elements to the appropriate portion of the integrated circuit. Alignment of package lid to photo-element is complicated if a hermetic package is required. Maintaining alignment during package lid sealing (either brazed or glass seal) will be difficult. If a ceramic lid is used, sizing differences between the array of holes in the lid and the array of photo-elements may limit the overall number of photo-elements that can be integrated in this fashion.

Commercial pressure transducers on integrated circuits have generally included devices utilizing a single crystal silicon diaphragm onto which diffused resistors are patterned. Diaphragm size is on the order of 0.250"×0.250"×0.001", so only about 75 transducers can be fabricated on a 4" silicon wafer. Furthermore, formation of the diaphragm is usually accomplished by back etching the silicon wafer, so that the etched wafer must be attached to a glass (pyrex) substrate to form the reference cavity. This results in a structure involving at least five materials, causing a significant differential thermal expansion influence on transducer sensitivity.

An alternate method of fabricating the diaphragm is to use a sacrificial layer which is removed via lateral etching as described in "Fabrication Techniques for Integrated Sensor Macrostructures," by H. Guckel and D. W. Burns, 1986 IEEE IEDM, pp 176-179, or "Scaling Limits in Batch-Fabricated Silicon Pressure Sensors," by Hin-Leung Chau and Kensall D. Wise, IEEE, Electrical Device Transactions, Vol. ED-34, No. 4, 1987, pp. 850-858. These types of devices utilize a diaphragm composed of a deposited film such as polysilicon. Because the thickness of this deposited film can be well-controlled and the overall diaphragm thickness is in the range of a few microns, diaphragm size can be reduced resulting in a higher number of transducers fabricated on a silicon wafer.

One final example of state-of-the-art pressure transducer fabrication can be seen in "Micro-Diaphragm Pressure Sensor," by S. Sugiyama et al., 1986 IEEE IEDM, pp. 184-187. Here, a $Si_3N_4$ layer is used for the diaphragm and the reference chamber is etched using a combination of a lateral etch of a polysilicon interlayer and an anisotropic etching of the silicon substrate forming a pyramid shaped cavity. Although diaphragm size is reduced to $80\mu \times 80\mu$, an alkali etchant (KOH) is used, which may contaminate oxides which are already present on the wafer surface. This is of special concern if MOS interface circuitry is placed alongside the transducer.

Thus it is an object of the present invention to provide a new structure for receiving and aligning fiber optic elements to photoelectric interface circuits.

Another object of the present invention is to provide an economic and reliable method of manufacturing integrated circuits including fiber optic elements and photoelectric interface circuits.

An even further object of the present invention is to provide an improved pressure transducer in an integrated circuit.

A still even further object of the present invention is to provide a pressure transducer in an integrated circuit requiring a minimum amount of area and greater diaphragm thickness control.

These and other objects are attained by forming moats in a first substrate having a bottom and at least one slanted side wall. A second substrate extends across the moat and includes a photoelectric interface circuit. A fiber optic element extends axially along the bottom wall terminating adjacent the slanted side wall of the moat and is in optical communication with the photoelectric interface circuit by the slanting side wall which has a reflective surface. The reflective surface is an oxide and has a thickness to produce reflective characteristics. The two substrates are bonded together by an oxide and any bonding oxide which is in the optical path between the photoelectric interface device and the fiber optics element has a thickness which permits light transmission. The photoelectric device may be, for example, a diode which can be a photo receiver or transmitter.

The method of forming the integrated circuit with the fiber optic element includes forming at least one moat on a first surface of the first substrate, which is part of a wafer, forming a reflective surface on the slanted wall and bonding a second wafer to the first wafer, and forming a photoelectric interface device in the second wafer above the slanted wall and dividing the wafer at the scribe line to form at least one die with the moat exposed at its side wall opposite the slanted wall. The fiber optic element is then inserted through the open wall to extend along the bottom wall and terminate adjacent the slanted wall. The moat with the slanted wall is formed by anisotropic etching and the reflective surface may be formed as an oxide layer. The oxide reflective layer is formed during the processing forming the photoelectric interface device. The second wafer has a thickness reduced after bonding and before device formation. Bonding is accomplished by providing a substantially thick bonding layer on one of the two surfaces and a very thin bonding layer on the other. The combined structure is then heated to produce a bond. The thickness of the post-bond bonding oxide layer is selected to permit light transmission.

A modification of the above process can be used to form a pressure transducer. The pressure transducer includes a cavity in the first surface of a substrate covered by a covering layer to seal the cavity. A sensor is formed on the cover layer above the cavity of a material which changes its electric characteristics as a function of the differential pressure above the sensor and in said cavity. A typical sensor could be a thin film resistor acting as a strain gauge which changes its electrical characteristics as it is bent. The method of fabrication includes forming a cavity in the first surface of the first substrate and applying a second substrate to the first substrate with a bonding layer on the second substrate. The combined structure is heated to bond the first and second substrates to each other. The second substrate is then completely or partially removed leaving the bonding layer sealing the cavity The pressure sensor is formed on the bonding layer or in the thin silicon layer of the second substrate over the cavity.

Other objects, advantages and novel features of the present invention will become apparent from the following detailed description of the invention when considered in conjunction with the accompanying drawings.

DETAILED DESCRIPTION OF THE DRAWINGS

Figure 1:
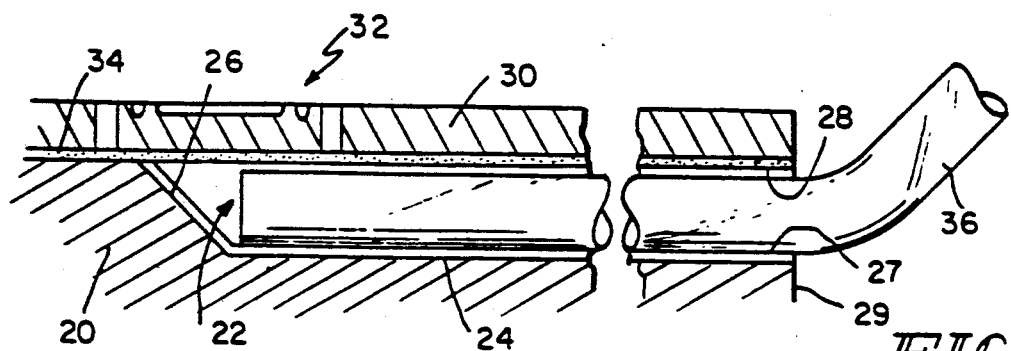
FIG. 1 is a cross-sectional view of an integrated circuit having an optical fiber communicating with a photoelectric interface device.

An integrated circuit incorporating a fiber optic element in communication with a photoelectric interface circuit is illustrated in FIG. 1. A first substrate 20 includes a moat 22 having a bottom wall 24 and at least one slanted side wall 26. The moat has an opening at side wall 28 along the edge 29 which results from the wafer sawing to produce the die. The walls of the moat 22 are covered by a reflective layer 27 which may be an oxide or a nitride. A second substrate 30 includes a photoelectric device 32 which is illustrated as a diode formed in an isolated region of the second substrate 30. A bonding layer 34, which may be for example an oxide, bonds the first and second substrates 20 and 30 to each other. An optical fiber element 36 extends through the opening 28 at the side 29 of the wafer axially along the bottom walls 24 and terminates adjacent the slanted side wall 26.

The thickness of the reflective layer 27 is selected so as to have optical reflecting characteristics. For example, the use of an oxide or a nitride, the thickness of the layer 27 would be in the range of 100 to 10000 Angstroms. The specific thickness would be a function of the wavelength being transmitted by the optical fiber and the thickness of material would be appropriately tuned to that wavelength. Since a portion of the bonding layer 34 is in the optical path between the optical fiber element 36 and the photoelectric device 32, its thickness should be selected so as to have a light transmitting characteristic. If the bonding layer 34 is an oxide, it would have a thickness in the range of 1000 to 40000 Angstroms. This range is selected to not only provide optical transmission characteristic, but to sufficiently isolate devices formed in the second substrate 30 from the first substrate, which may be grounded electrically.

Since the slant of wall 26 may be accurately determined, there is no misalignment based on the axial position of the optical fiber element 36. Thus alignment problems and positioning of the optical fiber element relative to the photoelectric device 32 is substantially eliminated. The photoelectric device 32 may be a photodiode and therefore may not only receive light from the fiber optic element 36 via the reflective surface 27 on slanted wall 26, but may also be a light emitting diode which would be activated to convert electrical signal to light signals to be received by the optical fiber element 36 and transmitted to another circuit.

Figure 2:
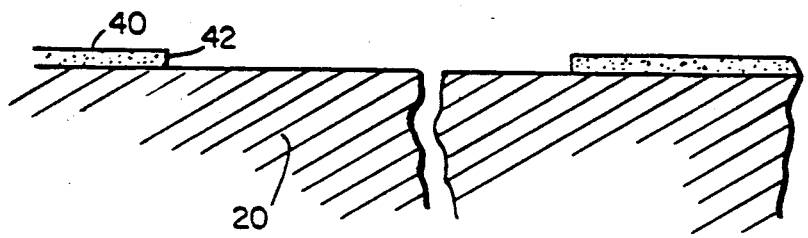
FIGS. 2, 3 and 5-6 are cross-sectional views of an integrated circuit at different stages of fabrication incorporating the principles of the present invention.
Figure 3:
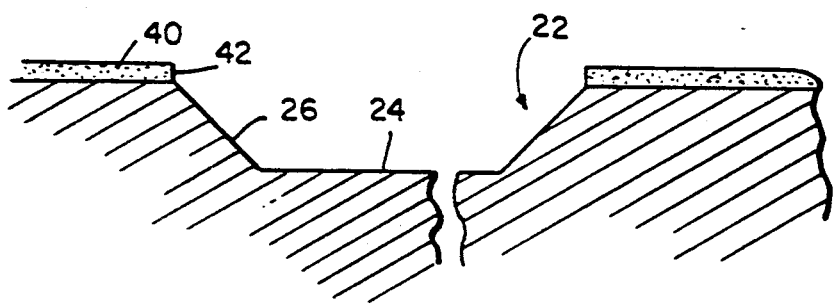
Figure 4:
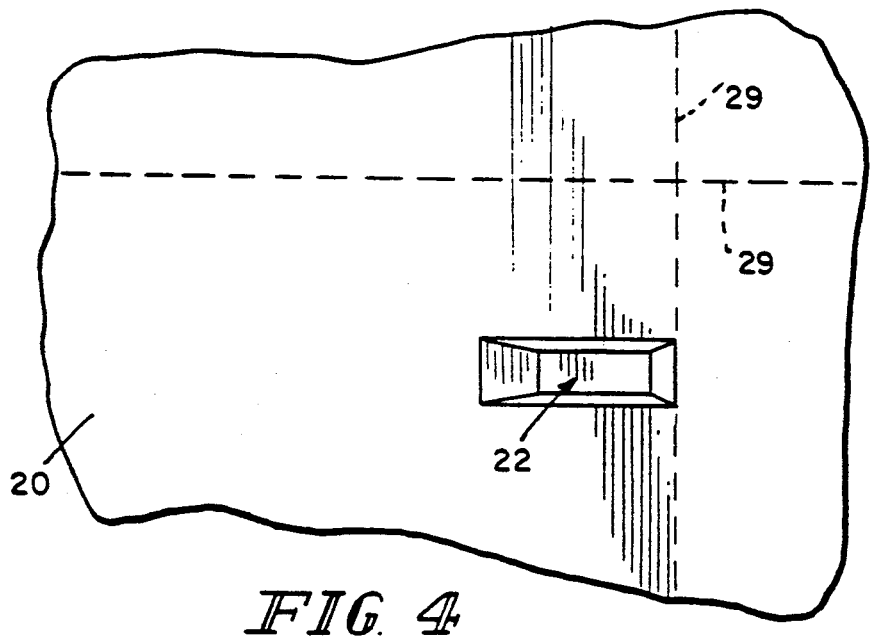
FIG. 4 is a plan view of the integrated circuit at the stage of fabrication of FIG. 3.

The first wafer 20 includes a plurality of dies. An oxide layer 40 is formed on the surface of the first substrate 20 and a moat aperture 42 is formed therein, as illustrated in FIG. 2. It should be noted that the moat aperture 42 extends axially to the edge of the die or scribe line 29. The substrate is then etched to produce the moat 22 illustrated in FIG. 3 extending to the die edge 29 as shown in FIG. 4. The starting material may be, for example, a silicon having a top surface orientation of [100] such that it will anisotropically etch to produce the walls 26 slanted with respect to the bottom wall 24 at a well-defined and reproducable angle. The size of the opening is selected such that for the appropriate depth that a bottom wall 24 is formed. The moat 22 will be in the range of $1\mu$ to $400\mu$ depending upon the diameter of the optical fiber to be inserted.

Figure 5:
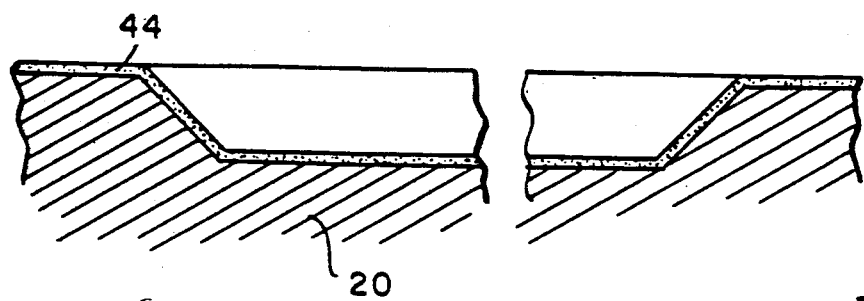
Figure 6:
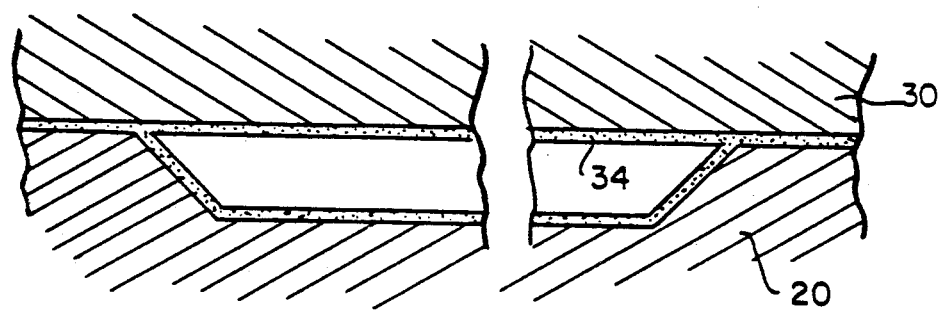

The oxide mask 40 is removed and a very thin layer of oxide 44 is applied to aid in bonding. The oxide layer 44 may be in the range of 30 to 100 Angstroms, as illustrated in FIG. 5. A second substrate 30 having a bonding layer 34 thereon is then applied on top of substrate 20 and the composite structure is heated to bond the two substrates 20 and 30 to each other. This structure is illustrated in FIG. 6. The second substrate 30 is reduced to the desired thickness in the range of 5000K Angstroms to 20 $\mu$m by, for example, grinding, etching, etc., and finely polished. It should be noted that any backside processing should be performed before the application of the bonding layer 34 to the second substrate 30. The second wafer 30 is then divided into isolated regions and impurities are introduced using well known techniques to form a photoelectric device 32. During the bonding process, the walls of the moat 22 are exposed to an oxidation atmosphere and consequently forms the oxidation layer 27. These processing parameters are taken into account such that the thickness of layer 27 has the optical characteristics to reflect light, whereas the post-bonded and post-processing bonding layer 34 above the moat 22 has light transmitting characteristics.

As an alternative to forming the bonding layer 34 on the second substrate 30, the bonding layer 34 may be formed on the first substrate 20 with a very thin bonding layer equivalent to 44 on the second substrate 30. The thickness of the bonding layer along the slanted wall 26 with the subsequently formed oxidation, as well as the thin bonding layer on the bottom of substrate 30 must each be tailored to provide the appropriate reflection and transmission characteristics respectively, as previously discussed.

The composite wafers are then cut by dicing saws into individual dies along the scribe lines. This not only forms individual dies, but exposes the moats 22 along the lateral edge 29 therein. The optical fibers 36 may then be inserted into the moats axially along the bottom wall 24 and terminating adjacent the slanted wall 26.

Figure 7:
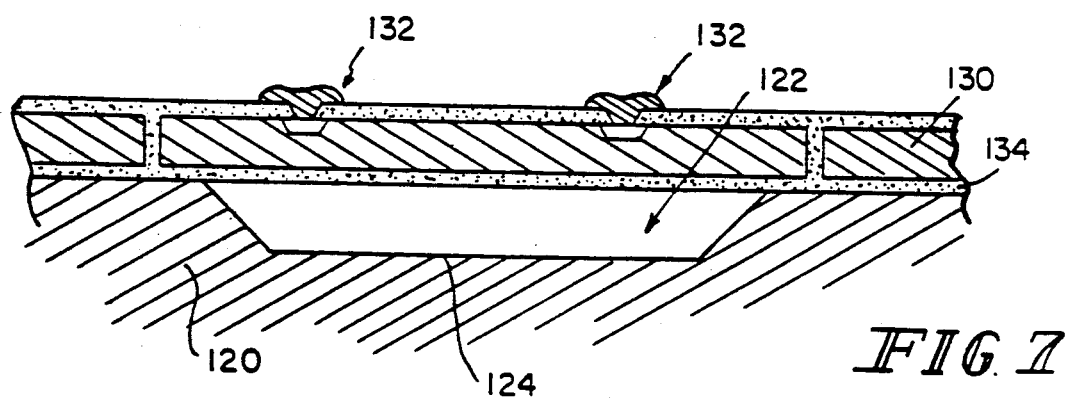
FIG. 7 is a cross-sectional view of an integrated circuit incorporating a pressure transducer according to the principles of the present invention.
Figure 8:
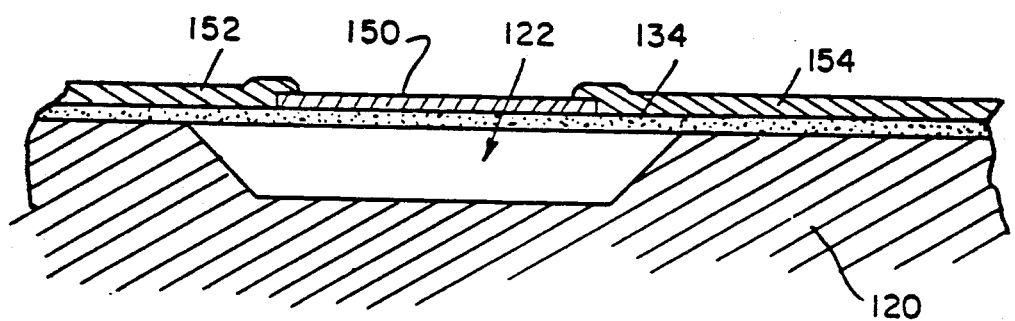
FIG. 8 is a cross-sectional view of an integrated circuit incorporating another pressure transducer according to the principles of the present invention.

In attempting to form the moats to receive the optical fibers, it was discovered that the bonding of two substrates produced a sealed cavity producing a pressurized compartment. This pressurization results from moisture trapped and heated during the bonding process. Although this sealed pressurized cavity may have an undesirable effect for the fiber optic connection to the integrated circuit, its use in combination with other elements to produce a pressure sensor became invaluable. As illustrated in FIG. 7, a substrate 120 has a cavity 122 formed therein. A cover layer 134 seals the cavity 122. A second substrate 130 including diffused resistors 132 is formed on cover layer 134 over the cavity 122. In FIG. 8, a pressure sensor 150, illustrated as a thin film resistor, is positioned on the cover layer 134 over the cavity 122. Interconnects 152 and 154 connect the pressure sensor 150 to other circuitry. The pressure sensor 150 is selected to be of a material which changes the electrical characteristics based on the pressure differential between the pressure of the atmosphere above the element 150 and that in the cavity 122. Because of the bending due to pressure differential, the element 150 may be a strain gauge or other type of pressure sensitive element.

Figure 9:
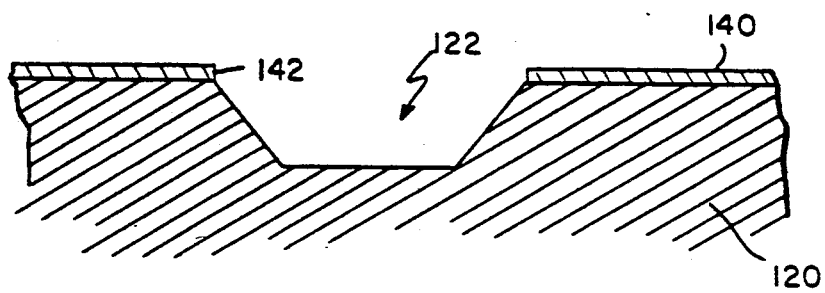
FIGS. 9-12 are cross-sectional views of an integrated circuit at various stages of fabrication incorporating the principles of the present invention.
Figure 10:
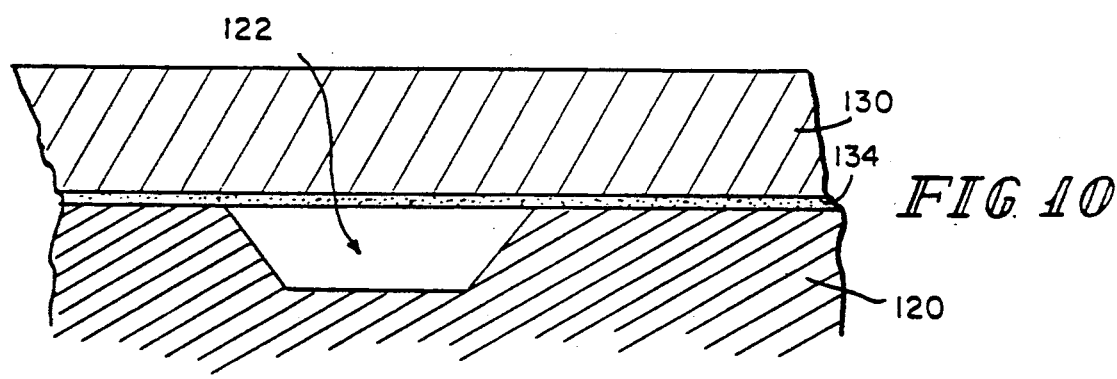
Figure 11:
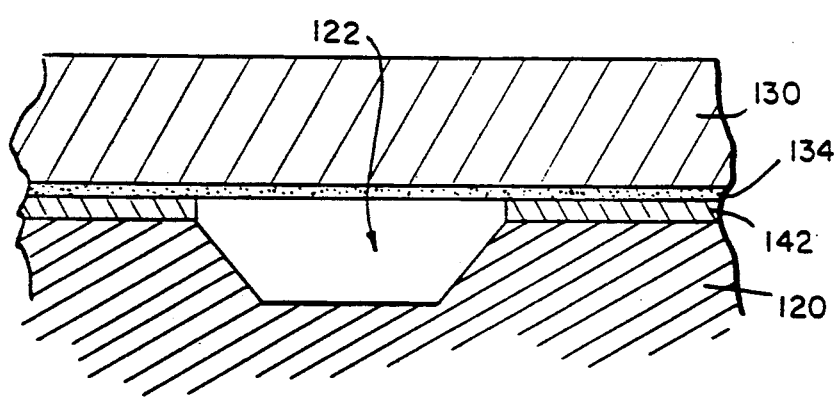

The method of fabrication begins as illustrated in FIG. 9, with a mask layer 140 with an opening 142. A cavity 122 is formed therein by etching. The mask 140 is then stripped and a second substrate 130, having a bonding layer 134 thereon, is then positioned on the the first substrate 120, covering the recess 122. The resulting structure is then heated to bond the two substrates 120 and 130 together by the bonding layer 134. The bonding layer 134 seals the cavity 122 and the moisture therein is converted to vapor to produce a pressurized compartment. This structure is illustrated in FIG. 10.

Figure 12:
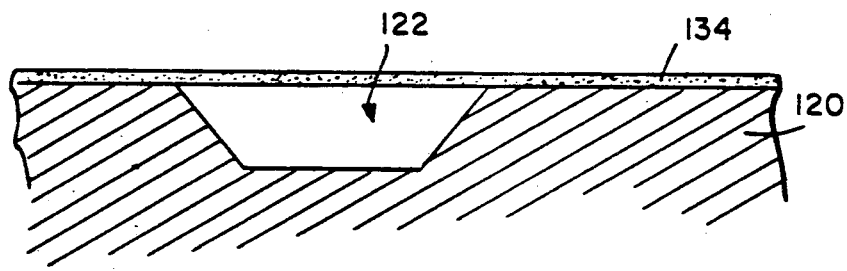

The second wafer 130 is then completely or partially removed by grinding followed by a final etch, for example a wet etch, down to the bonding layer 134. For the pressure sensor of FIG. 8, the second wafer 130 is etched and the resulting structure is illustrated in FIG. 12. The pressure sensor 150 may then be formed on the bonding layer 134 over the cavity 122. For the pressure sensor of FIG. 7, the second wafer is etched down to a thin layer and doped resistors are formed therein.

To offer the desirable deflection or transmission of pressure, the bonding layer 134, for example a form of oxide, should be in the range of 1000 to 40000 Angstroms. A typical example of the dimensions of the cavity 122 would have a depth in the range of $1\mu$ to $50\mu$ and a width and length in the range of $50\mu$ to $250\mu$. The thin film resistor 150 would have a thickness in the range of 100 to 10000 Angstroms. A good discussion on the dependence of electrical characteristics of resistors on the amount of deflection may be found, for example, in "Pressure Sensitivity in Anisotropically Etched Thin-Diaphragm Pressure Sensors," by Samuel K. Clark and Kensall D. Wise, IEEE Transactions on Electron Devices, Vol. ED-26, No. 12, 1979, pp. 1887-1896.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A method of fabricating a pressure transducer comprising:
   forming a cavity in a first surface of a first substrate;
   forming a bonding layer on a second surface of a second substrate;
   positioning said second substrate on said first substrate with said bonding layer therebetween and covering said cavity;
   heating to bond said first and second substrates to each other;
   removing said second substrate leaving said bonding layer sealing said cavity; and
   forming a pressure sensor on said bonding layer over said cavity.

2. A method according to claim 1, wherein forming a bonding layer includes thermally oxidizing said second substrate or chemical vapor deposition of an oxide bonding layer on said second surface.

3. A method according to claim 2, wherein said oxide bonding layer is formed to a thickness in the range of 1000 to 40000 Angstroms.

4. A method according to claim 1, wherein said second substrate is removed by grinding followed by etching.

5. A method according to claim 1, wherein forming said pressure sensor includes forming a thin film resistor on said bonding layer.

6. A method according to claim 1, wherein removing said second substrate is performed to reduce the second substrate to a thin second substrate layer and forming said pressure sensor includes forming diffused resistors in said thin second substrate layer.

* * * * *